United States Patent Office 3,425,924
Patented Feb. 4, 1969

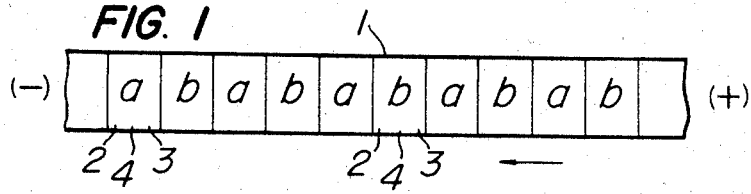
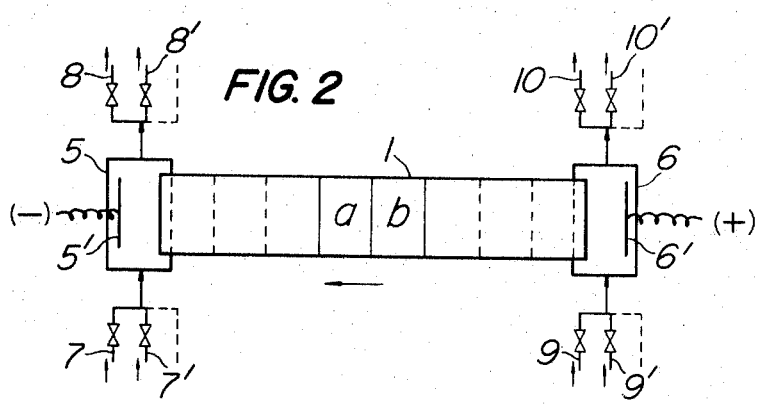
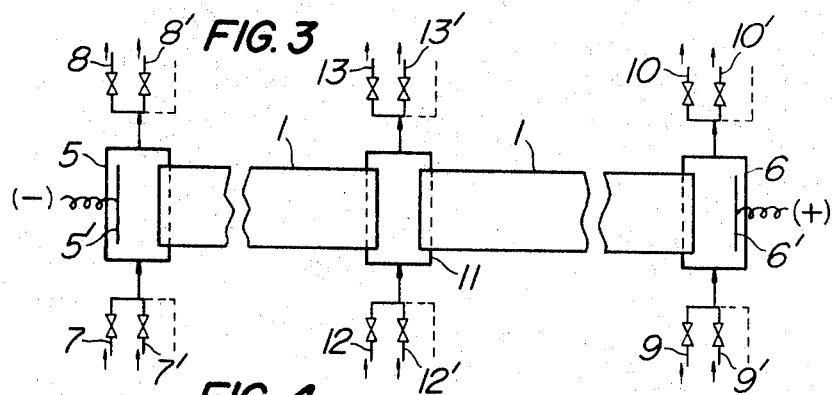
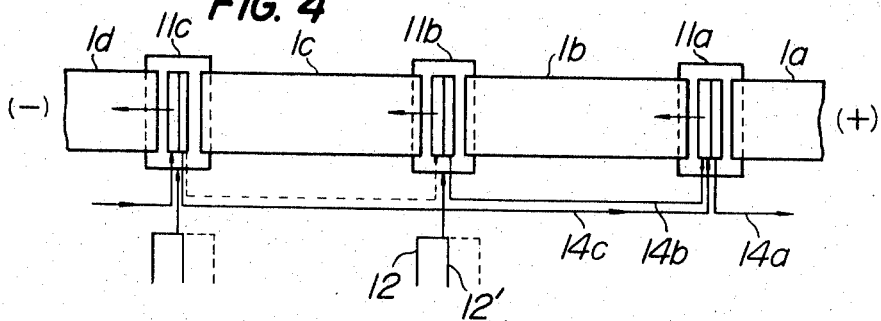

3,425,924
METHOD FOR SEPARATING AND
ENRICHING ISOTOPES
Maomi Seko, Hidetake Kakihana, and Kimiko Kurisu, Tokyo, Japan, assignors to Asahi Kasei Kogyo, Kabushiki Kaisha, Hidetake Kakihana and Atomic Fuel Corporation
Filed June 17, 1964, Ser. No. 375,835
Claims priority, application Japan, June 21, 1963, 38/31,166
U.S. Cl. 204—180        10 Claims
Int. Cl. B01d 59/38

This invention relates to a method for the separation and enrichment of isotopes by electromigration of ion through an ion exchange resin material which is large in size in at least two dimensional directions. More particularly, this invention relates to a method for the separation and enrichment of isotopes, especially isotopes of uranium, lithium, hydrogen, calcium, boron, nitrogen, chlorine, carbon and potassium which comprises passing direct electric current through an ion exchange resin material which is large in size in at least two dimensional directions to produce an electric field, alternately feeding at least two kinds of solutions, each containing different elements which exist in the state of ions to one end of the ion exchange material, thereby to produce a plurality of migration bands, each containing exclusively one kind of said elements in the state of ion in the ion exchange resin material and collecting these migration bands separately at the other end of the resin material.

For the separation and enrichment of isotopes, several physical methods such as gas diffusion method, centrifugal separation method or the like have been known. However, all of these methods require equipment of extremely large size and a large capital outlay which inevitably make products very expensive. There have been also known heretofore some chemical methods for separating isotopes. For example, methods which separate isotope by electromigration in an aqueous solution have been proposed by A. K. Brewer, S. L. Mardrosky [J. Research Nat. Bur. Standards 38, 137 (1947)], S. L. Mardrosky and S. Straus [ibid., 38, 185 (1947)] etc. However, these methods proved not effective because the migration of isotopic ions was disturbed by the migration of counter ions travelling in the opposite direction. Furthermore, due to the hydration of ion during the migration, the effect of separation caused by a difference in masses of isotopes is reduced. Accordingly, both separation and the enrichment of isotope on a commercial scale have been impossible in these methods.

There has been known also another method which was proposed by A. Klem and A. Nenbert [Zeitschrift für Naturforschung 16a 685 (1961)]. In this method, fused salt is used for the separation and enrichment of isotopes to remove the solvation or hydration effect, but this method also has great difficulties due to the employment of fused salt at high temperature. Still another electromigration method which uses granular ion exchange resins packed in a column for separating and enriching isotopes has been known. In this method, isotopic ions to be separated are adsorbed by the resins from the liquid through ion exchange reaction and subsequently migrate in the resins by virtue of the potential thereto applied.

The method which uses granular resin for the separation and enrichment of isotopes was so inefficient that another method using membranes instead of granular ion exchange resins is disclosed by U.S. Patent No. 2,989,457. In this method, isotopic ions are separated by electromigration through a membrane of regenerated cellulose or collodion. However, regenerated cellulose and collodion do not possess the characteristics for transmitting only cations selectively, and counter ions also migrate through the membrane. In addition to this, the durability of the membrane to various chemicals is not good. The effect of separation by the method of U.S. Patent No. 2,989,457 is very poor.

An object of the present invention is to provide a method for the separation and enrichment of isotopes wherein the above-mentioned disadvantages encountered in the conventional methods have been completely eliminated.

Another object of the present invention is to provide a method which enables isotopes to be separated and enriched continuously and economically with a commercial scale operation. Further object of the present invention is to provide a method for separating and enriching isotopes of an element in the state of the ion applicable to all kinds of elements except rare gas elements.

According to the present invention, these and other objects are attained by using a material of ion exchange resin which is large in size in at least dimensional directions, e.g. a membrane, a rod, a tube, or the like of cation or anion exchange resin, which is (hereinafter referred to as ion exchange resin material or resin material). When subjected to the action of electric field between the electrodes, isotopic ions are caused to travel from one electrode to another. Since there is no disturbance due to the migration of counter ions in the cation or anion permeable resin materials, the consumption of electricity for the separation is relatively small and the separation effect is much better.

In order that this invention may be more readily understood, reference will now be made with reference to the accompanying drawings. FIG. 1 is a diagrammatic representation of the process of separation. FIG. 2 is an explanatory drawing of the apparatus for separation. FIG. 3 and FIG. 4 are both diagrammatic views of apparatus for separation with inlet and outlet lines for solutions.

In FIG. 1, 1 is a cation exchange resin material one end of which is connected to an anode and another end of which is connected to a cathode compartment, and DC electric current passes through the ion exchange resin material. As an example, an embodiment of the present invention will be given hereunder wherein isotopic ions to be separated are cation and cation permeable resin material is used. When two kinds of electrolyte solutions A', and B' containing element A and B in the state of ion respectively are fed to the anode compartment alternately at an interval of a predetermined time in a succession of A'→B'→A'→B'. . . . Migration bands $a$ and $b$ are formed alternately in series in the resin material, each migration band having a clear boundary, and each element A or B existing exclusively in the state of ions therein, and these migration bands travelling through the resin material in the direction of the arrow toward the cathode compartment by virtue of applied potential. No counter ions travel in the opposite direction because any movable counter ions do not exist in the cation permeable resin materials. Since the mobility of the lighter isotopic ions is greater than that of the heavier isotopic ions, in the resin material.

Separation of isotopic ions start while the isotopic ions travel in the resin material toward the cathode. Accordingly, after travelling over a sufficient distance, the lighter isotopic ions are separated and concentrated in the vicinity of the boundary 2 on the cathode side of the migration band 2, while the heavier isotopic ions are concentrated in the vicinity of the boundary 3 on the anode side of the migration band. In the intermediate zone 4 in each migration band, the composition of lighter and heavier isotopic ions is substantially the same as that of the feed solution to the anode compartment. Concentrated and separated isotopic ions are collected at another end of ion exchange resin material by passing the outlet stream, which is periodically changed. Each migration band is mostly separated into two zones when migration band reaches the end of the resin material at each cathode side.

As stated above, the separation and enrichment of isotopic ions occur in the vicinity of the boundary which exists between two different migration bands.

When only one kind of electrolyte solution is fed to an ion exchange resin material, there is formed only a single band consisting of a mixture of isotopic ions, which travels toward the cathode. In the band, lighter isotopic ions travel at a greater speed than heavier isotopic ions.

After travelling for a certain period of time and over a certain distance, only a small amount of lighter isotopic ions are concentrated in the vicinity of front end of the band on the cathode side and a small amount of heavier isotopic ions are concentrated in the vicinity of the back end of the band on the anode side, while the majority of ions of two different mass numbers exist in a mixed state in the intermediate zone of the band. To obtain an appreciable amount of concentrated isotopic ions, an ion exchange material of enormous length and prolonged residence time is required. Such operation is not practical.

As stated above, the separation and concentration of isotopic ions take place in the vicinity of the boundaries of the migration band of one kind of ion, and it is thus much more effective to alternately feed at least two different kinds of electrolyte solutions at such a time interval as short as possible so as to produce many consecutive migration bands, each containing only one kind of ion, with clear boundaries therebetween at the vicinity of which the separation and concentration take place.

The more migration bands there exist, the greater amount of separated and enriched isotopic ions can be obtained. Explanation is made hereunder with reference to FIG. 1.

A plurality of migration bands $a$ containing one kind of cation A in the state of ion and $b$ containing another kind of cation B is formed alternately in series. A distinct boundary is formed between the two successive migration bands in a cation exchange resin material. With the lapse of time these migration bands proceed toward the cathode while causing the isotopic ions to concentrate in the vicinity of the boundary between the migration bands $a$ and $b$. The efficiency of separation in each migration band depends upon difference in mobility of each isotopic ion in the resin material. Factors responsible for determining mobility are ratio of mass numbers of isotopic ions, hydration condition, degree of cross-linkage of the matrix of resin, current density and the like. The greater the difference in isotopic mass number, the shorter the distance of travel, to obtain a desired separation efficiency. In general, a long distance of travel improves the separation efficiency. Accordingly, it is necessary to make the path of movement long when difference in mass of isotopes is small.

Distance of one migration band from one boundary to another is determined by various conditions such as kind of isotope to be separated, water content of the resin material, degree of cross-linkage, and electrical conductivity of resin material, method for supplying solutions to the resin material and other operational conditions, but as sufficient separation is effected in every several milimeters of migration band, it is possible to collect the separated isotopic ions selectively. For commercial operation, the distance of one migration band is adjusted to at least 1 centimeter and at the end of the electromigration, at least two zones, each containing concentrated lighter isotopic ions or heavier isotopic ions, formed, depending upon the solutions used. Each zone is, at the end of the migration, collected seperately.

As the seperation of isotopic ions occurs along the boundary between two different successive migration bands, it is sometimes effective to use at least two solutions each containing different kinds of ions so as to produce distinct boundaries. It is experimentally determined that a combination of two solutions, each containing uranyl ions and lithium ions respectively, a combination of two solutions, each containing uranyl ions and ammonium ions respectively, a combination of two solutions, each containing chloride ions and sulfate ions respectively can form clear boundaries between two solutions. It is desirable to make ions migrate along a straight path in the resin material to maintain distance boundaries.

Referring to FIG. 2 and FIG. 3, a pair of electrodes are disposed at both ends of resin material. A single or a plurality of resin materials can be placed between a pair of cathodes 5' and anode 6' as in FIG. 2 or FIG. 3. In FIG. 3, the resin materials 1 are connected in series with an intermediate compartment 11. The intermediate compartment may be used as electrode compartment. The foregoing disclosure relates to an example wherein isotopic ions are cations, electrolyte solutions are fed to the ion exchange material from the anode compartment and/or the intermediate compartment. When the isotopic ions to be separated and enriched are anions, the electrolyte solutions are fed to the ion exchange resin material from cathode compartment and/or intermediate compartment, migration bands travel toward anode compartment and the isotopic ions are collected at the anode compartment or intermediate compartments. In that case, in each migration band lighter isotopic ions are concentrated in the vicinity of the front boundary on the anode side and heavier isotopic ions in the vicinity of the rear boundary on the cathode side.

When isotopic cations and isotopic anions are desired to be separated simultaneously, it is possible to arrange cation exchange resin material and anion exchange resin material to be alternately connected in series and intermediate compartments to intervene therebetween to effect separation simultaneously.

Methods of feeding two kinds of electrolyte solutions to resin material are shown in FIG. 2 and FIG. 3. In FIG. 2, they are fed to the electrode compartments through the solution inlet stream 7, 7', 9 and 9'. In FIG. 3, they are fed to the electrode compartment and to the intermediate compartments through the solution inlet stream 7, 7', 12, 12', 9 and 9'. In order to form bands of suitable width, the solution stream is alternately at a certain time interval by switching 7 to 7', interchanged 12 to 12' and 9 to 9' or vice versa. When more than two kinds of solutions are to be fed, additional streams are added to the electrode compartments and the intermediate compartments through the dotted lines. Methods of collecting isotopic ions after migration through the resin material are shown in FIG. 2 and FIG. 3. Separated isotopic ions are taken out as outlet streams 8, 8', 10, 10', 13 and 13' by interchanging inlets and the corresponding outlets with other inlets and corresponding outlets at a predetermined time interval. Separated lighter isotopic ions are collected through 8, 13, 10 and separated heavier isotopic ions through 8', 13', 10', and vice versa.

It is sometimes desirable to make the concentration of feed solution as high as possible. When the radioactive isotopes are to be separated, the cycle for interchanging the inlet and the corresponding outlet stream with another inlet and the corresponding outlet stream can be made by using a Geigercounter.

In order to prevent the influence due to electrode reaction, the electrode compartments are often isolated from ion exchange resin material by dividing the compartments with resin membranes or neutral membranes, and the solution containing isotopic ions and the electrode solution are supplied separately to the compartment. Any electrode solution may be used, provided that the electrode solution and the solution containing isotopic ions are miscible and that the solutions do not coprecipitate when the separated isotopic ions are collected from the end of the resin material.

In general, the separation by electrical migration progresses under applied electric potential, and thus resin material becomes hot. Hot resin material can be effectively cooled by passing a cooling gas or liquid over the vicinity of resin material.

Optimum current density for electro-migration ranges from about 0.1 to 100 ampere per 100 cm.$^2$. When a high current density is used, it is necessary to agitate the solution in the electrode compartments and or intermediate compartments enough to prevent polarization at the ends of the resin material. It is also effective to reverse the polarity or superimpose the alternating current on direct current instantaneously to prevent the polarization.

When solutions contain only a small amount of isotopic ions to be separated, the separation and enrichment are performed in a cascade system. Such general feature is shown in FIG. 4 consisting of resin materials $1a$, $1b$, $1c$ and $1d$, intermediate compartments $11a$, $11b$, $11c$ and electrode compartments (not shown), where a cascade system for the separation of FIG. 4 shows a cascade system for the separation of two isotopes of the same kind of ion in which the intermediate compartments are disposed between two successive resin materials. In such a system, each migration band is divided into two portions at an arbitrary ratio in the intermediate compartments $11a$, $11b$, $11c$ . . . (or the electrode compartment) after migration through each resin material, wherein the former portion containing a greater amount of lighter isotopic ions is sent to the next resin material to continue further migration, the rear half portion of each migration band containing a greater amount of heavier isotopic ions is returned to the previous intermediate (or electrode) compartment through external pipes as a reflux shown by arrow lines $14a$, $14b$, and $14c$ for a further concentrating operation.

By repeating such operations even if the content of isotopic ion is very small in solution, the isotopic ions can be concentrated in a solution more efficiently than in the process without any reflux system. Required number of steps of resin material, reflux ratio, required length of resin material and the like can be determined by the isotopic composition of solution to be treated and separation efficiency.

The solutions to be treated are fed to the intermediate compartments, $11a$ $11b$ or $11c$ or the electrode compartments depending upon the compositions of the solutions, 12 and 12' are the inlet pipes to an intermediate compartment $11b$. By employing one cascade system, it is possible to separate and concentrate two kinds of isotopes from their mixture solution.

When $n$ kinds of the isotopes are to be separated, it is possible to perform the separation by use of $n-1$ cascade systems.

In a solution containing three isotopes, each isotope can be separated by dividing each migration band into three fractions of front, middle and rear zones, returning these three fractions to intermediate compartments respectively, each having a corresponding concentration of isotopic ions and thus forming more complicated cascade systems.

Resin material used in the present invention is a material having ion exchangable groups and having large size at least two dimensionally. Rod tube and any other form as well as plate and membrane are suitable. As a material having ion exchangable groups, the most preferable material is synthetic ion exchange resin. When thickness is large, it is possible to treat a large amount of solution in unit of time.

A cationic isotope is separated by using cation exchange resin material, whereas anionic isotope is separated by using anion exchange resin material.

Cation exchange resin is selected from homogeneous or non-homogeneous ion exchange resins having radicals of sulfonic acid, carboxylic acid, phosphoric acid or hydroxyl radicals. Anion exchange resins are selected from homogeneous or non-homogeneous ion exchange resins having amino or quaternary ammonium radicals.

The matrix of the resin is preferably selected from the polymeric resin of monovinyl compound such as styrene and divinyl compound such as divinyl benzene, and into which is introduced sulfonic acid radical or amino radical, or quaternary ammonium radical or phosphoric acid radial. Ion exchange resin material may be selected from copolymers of monovinyl compounds having the group of sulfonic acid radical, its substituted radical, carboxylic acid radical or its substituted radical, and divinyl compound.

Ion exchange resin material may be produced also by condensation of aromatic compound having sulfonic radical or amino radical, and aldehyde.

A resin material suitable for the process has an ion exchange capacity of more than 0.1 milli-equivalent per 1 gram of dry resin.

Before being fixed into a migration equipment, the ion exchange group of the resin material may be in a form of neutral salt, acid or alkaline ion.

As described above, the present invention relates to the method of separating and enriching isotopes which comprises feeding at least two different kinds of colutions alternatively to an ion exchange resin material having at least two-dimensionally large size and migrating the ions of isotopes under an electric potential applied through the ion exchange material, forming a boundary between two successive migration bands, each containing different kinds of ions, separating isotopic ions within each migration band in the vicinity of said boundaries. The separation of isotopes in an ionic state is carried out by difference in the mobility of each isotopic ion due to the difference in the mass of said isotopic ion.

Therefore, the method of the present invention is applicable to separation of isotopes of any organic and inorganic compounds dissociable into ions, especially to the separation of isotopes of uranium, lithium, hydrogen, calcium, boron, nitrogen, chlorine, potassium and carbon. There are wide varieties of combination of valency and form of ion, and condition of solution.

Thus, all natural or artificial radioactive isotope or non-radioactive isotopes, except rare gas, can be separated and concentrated by the method of present invention. When the present invention is applied to a solution containing isotopic ions, it is useful not only for ions of inorganic compound in aqueous solution but also for ions of organic compound in aqueous or organic solution so long as the isotope is dissolved in ionic state. Accordingly it is possible to separate and obtain economically useful isotope such as uranium, lithium, hydrogen, calcium, boron, nitrogen, chlorine, carbon, potassium or the like.

A more comprehensive understanding of the invention can be obtained by referring to the following illustrative examples, which are not limitative of the scope of invention.

Example 1

Ammonium substituted sulfonic acid cation exchange membrane having a thickness of 0.2 millimeter, a width of 20 centimeter and a length of 80 centimeter made of a copolymer of styrene-divinyl benzene was placed between a nickel cathode and a platinum plated tantalum anode in such a position as the 80 centimeter side be placed between two electrode compartments. As a cathode solution, 0.1 mol solution of sodium chloride was circulated in a cathode compartment 5. As an anode solution 0.05 mol solution of uranyl chloride and 0.05 mol solution of ammonium chloride was supplied to an anode compartment 6 alternately. Electric potential was applied to the ion exchange membrane. The current was maintained at 30 milli-amper, and the average D.C. voltage was 1005 v. The feeding of uranyl chloride solution and ammonium chloride solution to the anode compartment was interchanged alternately every 68 hours so as to alternately form alternate 8 cm. migration bands of uranyl ion and ammonium ion in the resin membrane. The content of $^{235}U$ in total uranium of uranyl chloride solution to be fed to the anode compartment was 0.7185%. Uranyl ion and ammonium ion migrated in the cation exchange membrane from the anode side toward the cathode side while maintaining 8 cm. of successive migration bands with distinct boundaries between two successive bands. First uranyl ion band reached the cathode compartment in 679 hours after starting. At the cathode compartment the migrated ions were collected into the cathode solution in such a way as a lighter uranyl ions-enriched zone and a heavier uranyl-enriched zone in the migration band, were separately collected. Thus, the front 4 cam portion of each uranyl ion band was collected as the first fraction, the following rear 4 cm. portion as the second fraction, and an entire subsequent migration band of ammonium ion was collected as the third fraction in the cathode compartment. The collection was repeated in that way. The collecting of the first, second and third fractions required 34 hours, 34 hours and 68 hours respectively.

Amounts of uranium in the first and second fractions each migration band which was collected in the cathode compartment were 4,510 g. and 4,545 g. respectively. The percentages of $^{235}U$ in total uranium determined by means of a mass spectrometer were 0.728 percent in the first fraction and 0.7089 percent in the second fraction. In other words, while migrating through the 80 cm. cation exchange membrane, $^{235}U$ was concentrated by 1.32% in the first fraction and $^{238}U$ by 1.32% in the second fraction.

Example 2

A cation exchange resin membrane of sulfonated styrene-divinyl benzene polymer having thickness of 0.2 millimeter, width of 40 centimeters and length of 100 centimeters was placed in such a way as its longest side be placed between a cathode and an anode compartment. DC of 60 ma. at 960 v. was applied to the membrane. Four ends of said cation exchange resin membrane were held with polyethylene gaskets 10 cm., wide and 1 mm.- thick margin. The part surrounded by gasket were used as a path for cooling water. 0.1 mol lithium chloride solution and 0.1 mol uranyl chloride solution were fed in this order alternately into the anode compartment so as to produce a plurality of migration bands each having 8 cm. width with clear boundary between two successive bands. Each migration band travelled through the membrane toward the cathode. The potential was maintained at 60 ma. and the voltage at 960 v. The migration bands through the membrane element A or B existing exclusively in the state of ions therein, and these migration bands traveling through the resin material reached the cathode compartment. A 2 cm. wide zone of lithium ion band on the anode side and successive 2 cm. wide zone of uranyl ion band on the cathode side were collected as the first fraction, an intermediate 4 cm. wide zone of uranyl ion, band as the second fraction, a rear 2 cm. wide zone of said uranyl ion, band on the anode side and a successive 2 cm. wide zone of lithium ion band on the cathode side as the third fraction and the intermediate 4 cm. wide zone of said lithium ion band as the fourth fraction.

The content of $^{235}U$ in total uranyl ion fed to the anode compartment was 0.7185% and 7L/6L in lithium ion was 12.30.

Analytical result of each fraction was as follows:

Example 3

100 sheets of cation exchange resin membranes of sulfonated stylene-divinyl benzene copolymer having a thickness of 0.2 millimeter, a width of 40 centimeter and a length of 100 centimeter were placed in such a way as their 100 cm. sides lay between a cathode compartment and anode compartment, with the interposition, therebetween, of gaskets having 2 mm. thick and 10 cm.- wide margin. Water was circulated into the space enclosed by gaskets for cooling of the cation exchange membranes.

0.1 mol of hydrochloric acid was circulated in the cathode compartment, while 0.1 mol solution of lithium chloride and 0.1 mol solution of ammonium chloride were fed to the anode compartment alternately by interchanging the ducts for the inlet stream at an interval of 75 hours. The content of $6_{Li}$ in the lithium solution was 7.52 percent. Applied potential was 300 volt and electric current was maintained at 40 a.

Alternate migration bands of lithium ions and ammonium ions were formed in the cation exchange membranes. Each lithium ion band was divided into two zones, front zone of which was collected as the first fraction and the rear zone as the second fraction. The ammonium ion band was collected as the third fraction. The collecting was repeated.

The contents of lithium contained in the first and second fractions were 3.91 g. and 3.90 g. respectively.

$^6Li/Li$ in the first and second fraction were 8.30% and 6.78% respectively, i.e. $^6Li$ was concentrated by 10% after migration over 100 cm. through the cation exchange resin membrane. The composition of isotopes in the third fraction was the same as that of feed solution to the anode compartment.

Example 4

A sheet of quaternary ammonium type anion exchange membrane which is made by chloromethylation and amination of styrene-divinyl benzene polymer, having 0.3 mm. thickness, 40 cm. width and 1 m. length be placed as in Example 2 in such a way as the sides of 1 meter was located between a cathode and an anode. 1 normal caustic soda solution was circulated in the anode compartment. 1 normal sodium chloride solution and 1 normal sodium sulfate solution was fed to the cathode chamber alternately at an interval of 9.5 hours, D.C. current of 50 ma. was passed through the membrane. A plurality of migration bands of chloride ions and of sulfate ions, each having 4 cm. width, were formed on the anion exchange membrane. The concentration of $^{35}Cl$ per total chloride ion in sodium chloride solution supplied to the cathode compartment was 75.53 percent. The front half zone of the migration band of chloride ion was collected in anode chamber as the first fraction, the rear half zone as the second fraction, and the total migration band of sulfate ion as the third fraction. The collection was repeated. According to the analytical result, the first fraction contained 0.31 g. of chloride ion, and content of $^{35}Cl$ per total chloride ions was 78.01 percent and that of $^{36}Cl$ was 21.97 percent. The second fraction contained 0.30 g. of chloride ions and a concentration of $^{35}Cl$ per total chloride ions was 72.02 percent and that of $^{36}Cl$ was 27.99 percent. The result of the isotope analysis showed that the third fraction had the same as that of the feed solution.

Example 5

1250 sheets of cation exchange membranes, each having 100 cm. length, 40 cm. width, 0.2 mm. thickness as in

| | $^{235}U/U$ (percent) | Ratio of concentration of $^{235}U$ (percent) | Amount of migrated uranium (mg.) | $^7Li/^6Li$ | Ratio of concentration of $^6Li$ (percent) | Amount of migrated lithium (mg.) |
|---|---|---|---|---|---|---|
| The first fraction | 0.7257 | 1 | 400 | 13.54 | 10 | 20 |
| The second fraction | 0.7185 | 0 | | | | |
| The third fraction | 0.71110 | −1 | 400 | 11.05 | −10 | 20 |
| The fourth fraction | | | | 12.30 | 0 | |

Example 3 were connected in series to make a 1250 stage cathode system as shown in FIG. 4, and 1249 intermediate compartments were disposed so that each intermediate compartment may be between two successive membranes. These intermediate compartments were used for feeding and discharging the solution. Further, two compartments were placed at both outmost membranes as cathode and an anode compartment. One membrane and two successive compartments were connected so that the ionic flow may constitute a cascade system as shown in FIG. 4. 1100 stages of cation exchange membranes on the cathode side were used for the concentration of $^{235}U$, and 150 stages of the resin membranes on the anode side were used to recover $^{238}U$. The intermediate compartment shown as 11b in FIG. 4, which is connected to the anode side of 1100 step membrane (1c of FIG. 4) from the membrane being connected to the cathode compartment is supplied with a uranyl nitrate solution containing 0.7185 percent of $^{235}U$ per total uranium and ammonium chloride solution alternately every 34 hours. D.C. voltage was supplied at 40 cm. A.

Thus a series of alternate migration bands of uranyl ions and ammonium ions, each having 4 cm. length, were formed. After the stationary state was attained, 2 cm. front half zone of the uranyl migration band (i.e. the zone where $^{235}U$ is concentrated) which reached at each intermediate compartment for example, (11c in FIG. 4) after migrating through a cation exchange resin membrane (1c in FIG. 4) was supplied continuedly to migrate into the next membrane (1d in FIG. 4), and the rear half portion of the above-mentioned migration band (i.e. the part in which $^{238}U$ is concentrated) was refluxed through an outside pipeline (14c in FIG. 4) to an upstream intermediate compartment (11a in FIG. 4) for a further separation by electromigration. Similar operation was made for all the stages. The ratio of the concentration of $^{235}U/U$ was 6.8 percent in the outlet solution collected at the cathode compartment.

What is claimed is:

1. A method for separating and enriching isotopes existing in the state of ions in solution, said method comprising passing direct electric current through at least one ion exchange resin material having a large size in at least two dimensions to produce a potential gradient in the longitudinal direction through said ion exchange resin material, feeding alternately and repeatedly at least two different kinds of solutions containing different elements other than rare gas elements in the state of ions to one end of said ion exchange resin material connected to an electrode having the same polarity as the ions to be enriched and separated, the other end of said ion exchange resin material being connected to an electrode of opposite polarity to produce a series of alternate migration bands, each of said migration bands consisting exclusively of one kind of said isotopes in the state of ions and a plurality of partitions therebetween, to transfer said migration bands toward said other end of the ion exchange resin material through the said ion exchange resin material, and periodically collecting migration bands at the other end of said resin material by dividing each of the bands into at least two portions, to thereby obtain a solution containing the separated and enriched isotope in the state of ions in solution.

2. A method according to claim 1 wherein at least two said ion exchange resin materials are placed between a pair of electrode compartments conductively connected therewith, said ion exchange resin materials being connected in series with more than one intermediate compartment placed conductively therebetween and functionally connected therewith, the solution being fed into or discharged from said electrode compartments and said intermediate compartments.

3. A method according to claim 2 wherein the feeding and collecting of the solution into and from the ion exchange resin material is effected through inlet and outlet zones in each intermediate compartment and electrode compartment by interchanging said inlet and outlet zones periodically at a predetermined time interval.

4. A method according to claim 2 wherein each said migration band is collected in one of the electrode compartments and/or intermediate compartments by dividing each migration band into two portions and collecting each of said portions as a separate fraction.

5. A method according to claim 2 wherein each said migration band is collected in one of the electrode compartments and/or intermediate compartments by dividing each migration band into three portions, the front portion of one migration band and the rear portion of the preceding band being collected together as one fraction and the intermediate portion of said migration band being collected as another fraction.

6. A method according to claim 2 wherein each said migration band is divided into two portions in each intermediate chamber, after migrating through at least one said ion exchange resin material, the front portion of each of said two portions being fed to the next ion exchange resin material and the rear portion of each of said two portions being returned into any of the previous intermediate compartments for a further separating operation, and the flow of solution between any two compartments form a cascade system.

7. A method according to claim 2 wherein said ion exchange resin material is a membrane, a rod or a tube.

8. A method according to claim 2 wherein at least one cation exchange resin material and anion exchange resin material are alternately connected in series with more than one intermediate compartment placed therebetween between a pair of electrode compartments at the end of said series.

9. A method according to claim 1 wherein at least one of said solutions contains at least one of the elements selected from the group consisting of uranium, lithium, hydrogen, calcium, boron, nitrogen chlorine potassium and carbon in the state of ions.

10. A method according to claim 1 wherein a combination of ions contained in said two different kinds of solutions are selected from the group consisting of a combination of uranyl ion and ammonium ion, uranyl ion and lithium ion and chloride ion and sulfate ion.

References Cited

UNITED STATES PATENTS 2,989,457   6/1961   Van Oss et al. _____ 204—299

OTHER REFERENCES

Helfferich, "Ion Exchange" (1962), McGran-Hill Book Company, Inc., p. 12.

JOHN H. MACK, *Primary Examiner.*

A.C. PRESCOTT, *Assistant Examiner.*

UNITED STATES PATENT OFFICE
CERTIFICATE OF CORRECTION

Patent No. 3,425,924                                            February 4, 1969

Maomi Seko et al.

It is certified that error appears in the above identified patent and that said Letters Patent are hereby corrected as shown below:

In the heading to the printed specification, lines 6 and 7, "Atomic Fuel Corporation" should read -- Power Reactor and Nuclear Fuel Development Corporation --.

Signed and sealed this 24th day of March 1970.

(SEAL)
Attest:

Edward M. Fletcher, Jr.                          WILLIAM E. SCHUYLER, JR.
Attesting Officer                                           Commissioner of Patents